UNITED STATES PATENT OFFICE.

JOHN HENRY WILLIAMS STRINGFELLOW, OF WALTHAMSTOW, ENGLAND.

PROCESS OF SOLIDIFYING LIQUID HYDROCARBONS.

SPECIFICATION forming part of Letters Patent No. 454,777, dated June 23, 1891.

Application filed December 20, 1890. Serial No. 375,320. (No specimens.)

*To all whom it may concern:*

Be it known that I, JOHN HENRY WILLIAMS STRINGFELLOW, of No. 11 Barclay Road, Walthamstow, in the county of Essex, England, have invented a new and useful Improvement in the Solidification of Liquid Hydrocarbons, of which the following is a specification.

The objects of my invention are twofold—namely, first, to provide a practicable and improved method of solidifying liquid hydrocarbons so as to obviate the danger and expense now attending their carriage and storage for use; second, to provide a material for generating light, heat, power, and other purposes in which water is incorporated with hydrocarbons in varying proportions, as desired.

Various attempts have been made to solidify hydrocarbons, in some of which a decoction or extract of *Quillaia saponaria* or other saponifier has been used. This method, besides involving a long operation, causes a further loss by the solid matter of the saponifier from which the decoction or extract is made being thrown away. Another disadvantage and expense arises from the difficulty of incorporating watery extract with the liquid hydrocarbons without applying heat. So far as I can ascertain, the attempts to carry out such a method on a commercial scale have hitherto proved impracticable. Now my invention is designed to remove all these difficulties of dealing with hydrocarbons; and it consists in the process of solidification described, as follows:

In carrying out the process I take a vegetable saponifier—such, for example, as *Quillaia saponaria* bark—and pulverize it. Of this powder I take a certain quantity in its normal dry state and introduce it into the vessel containing the liquid hydrocarbon, the quantity of powder used depending upon the gravity of the hydrocarbon and the purpose for which it is required. If a volatile oil is to be treated, I take an amount of *Quillaia saponaria* powder equal to, say, one per cent. of the hydrocarbon. Then I agitate the whole so as to thoroughly distribute the saponifier throughout the liquid. After this I add water as necessary, sometimes, say, equal to ten per cent. of the hydrocarbon liquid, but sometimes considerably more than ten per cent. When the water is added, it is by any suitable means intimately mixed with the hydrocarbon, the result of which is that, the water acting chemically upon the distributed particles of the saponifier, and this reacting upon the hydrocarbon, solidification is set up and the whole is quickly reduced to a gelatinous state. The operation is so rapid with proper appliances for pulverizing the saponifier and mixing the materials that it only occupies a fraction of the time necessary to effect the operation by the method of preparing and using a liquid extract of saponifier, even supposing this latter method was commercially practicable.

Although my invention is effective when cold water is added to the saponifier and the hydrocarbon, I sometimes use warm water, and reserve to myself the option of using either cold or hot water.

For mixing the water with the saponifier and the hydrocarbon I prefer to use an arrangement of tank or vessel in which the materials are caused to pass and repass through a perforated plate or plates or between closely-placed wires or any similar contrivance, so as to insure intimate mechanical mixture, from which results a rapid union. The liquid hydrocarbon and water thus solidified or gelatinized forms a product or combination highly valuable for many purposes. While heated in the act of burning, it does not flow. Besides this, the oxygen and hydrogen, the component parts of the water, being decomposed, are potential auxiliaries in the combustion of the hydrocarbon.

When it is required to reliquefy the gelatinous or solidified material in order to prepare the hydrocarbon for use in a liquid form, this is readily done by treating the solidified material in a water-tight vessel with acetic or other suitable acid, pouring the same onto the surface of the solidified mass so as to completely cover it. The proportion of acid necessary for producing reaction is not more than two and one-half per cent. of the solidified hydrocarbon. After standing for a few hours, according to the vessel used and the material acted upon, the acid will cause the saponaria and water to separate from the hydrocarbon and precipitate to the bottom of the vessel, thus leaving the liquid hydrocarbon free to be used or drawn off, as required.

Having now described my invention, what I claim is—

The improvement in the process of gelatinizing or solidifying liquid hydrocarbons, which consists in first mixing with the liquid hydrocarbons a pulverized vegetable saponifier and afterward adding to and intimately mixing with the first-named mixture a quantity of water, substantially as herein described.

JOHN HENRY WILLIAMS STRINGFELLOW.

Witnesses:
  H. K. WHITE,
  H. F. C. GOLTZ.